United States Patent [19]

Shimizu et al.

[11] Patent Number: 4,994,313

[45] Date of Patent: Feb. 19, 1991

[54] PARISON AND BLOW-MOLDED CONTAINER AND PROCESSES FOR PRODUCTION THEREOF

[75] Inventors: Senzo Shimizu, Odawara; Yoshiaki Momose, Hadano; Yozo Yoshida; Takao Ohta, both of Hiratsuka, all of Japan

[73] Assignee: Mitsubishi Gas Chemical Company, Inc., Tokyo, Japan

[21] Appl. No.: 394,292

[22] Filed: Aug. 15, 1989

Related U.S. Application Data

[63] Continuation of Ser. No. 150,372, Jan. 29, 1988, abandoned.

[30] Foreign Application Priority Data

Feb. 6, 1987 [JP] Japan ................................. 62-24768
Nov. 27, 1987 [JP] Japan ................................. 62-297759

[51] Int. Cl.$^5$ ............................................. B65D 1/00
[52] U.S. Cl. .................................... 428/36.7; 215/16; 215/12.1; 428/424.4; 428/475.2; 428/480; 428/542.8
[58] Field of Search ............... 428/36.7, 542.8, 474.4, 428/475.2, 480; 215/12.1, 1 C

[56] References Cited

U.S. PATENT DOCUMENTS

| | | | |
|---|---|---|---|
| 4,501,781 | 2/1985 | Kushida | 428/35 |
| 4,535,901 | 8/1985 | Okudaira et al. | 428/35 |
| 4,550,043 | 10/1985 | Beck | 428/522 |
| 4,564,541 | 1/1986 | Taira et al. | 428/35 |
| 4,728,549 | 3/1988 | Shimizu et al. | 428/475.2 |

FOREIGN PATENT DOCUMENTS 59-229656  5/1986  Japan .

OTHER PUBLICATIONS

Patent Abstracts of Japan, vol. 11, No. 135 (M-585) [2582], Apr. 28, 1987, Abstract of JP-A-61 274 912.

*Primary Examiner*—James Seidleck
*Attorney, Agent, or Firm*—Wenderoth, Lind & Ponack

[57] ABSTRACT

A parison, as a precursor of a container, composed at least of a thermoplastic resin (resin A) and another thermoplastic resin having excellent gas-barrier property (resin B) and containing a multilayered resin layer at least in an intermediate layer between an outermost layer and an innermost layer each composed of resin A at parts other than the open end part of the mouth portion of the parison, or wholly in the parison, said multilayered resin layer being formed by using an injection-molding machine equipped with a static mixing-stirring device provided in a nozzle portion of an injection cylinder, or in a mold, or in a resin flow passage between the nozzle portion and a mold, and injecting the resins A and B through the static mixing-stirring device so that flows of the resins A and B are divided in a plurality of thin layers parallel to the flowing direction; and a process for production thereof. A container obtained by biaxially stretching and blow-molding the said parison has excellent transparency, gas-barrier property and mechanical strength.

16 Claims, 2 Drawing Sheets

MULTILAYERED RESIN LAYER

Fig. 5

Fig. 6
ENLARGED VIEW OF PART M

RESIN A

MULTILAYERED RESIN LAYER

Fig. 7

Fig. 8
ENLARGED VIEW OF PART N

RESIN A

RESIN A

MULTILAYERED RESIN LAYER

PARISON AND BLOW-MOLDED CONTAINER AND PROCESSES FOR PRODUCTION THEREOF

This application is a continuation of now abandoned application Ser. No. 150,372 filed on Jan. 29, 1988.

BACKGROUND OF THE INVENTION

1. Field of the Invention

This invention relates to a parison and a container obtained by biaxial stretch-blow molding of the parison and to processes for production thereof. More specifically, it relates to a biaxially stretched blow molded container having excellent transparency, gas-barrier property and mechanical strength, and a parison which is a precursor of the container, and to processes for production thereof.

2. Description of the Prior Art

Glass containers have been widely used heretofore for holding a variety of goods, for example carbonated drinks, beer, wines and liquors, seasonings, oils, cosmetics, and detergents. The glass containers, however, are defective in regard to handling, safety, and the cost of production.

In the field of containers for seasonings, carbonated drinks, detergents and cosmetics which require transparency, biaxially stretched blow-molded containers of various resins, mainly polyethylene terephthalate (PET for short), have been widely used.

Biaxially oriented containers of PET do not necessarily have perfect properties for packaging purposes. When, for example, foods and beverages which require a high level of gas barrier property are held in such containers, the flavor of the contents will be spoiled because these resins do not possess sufficient oxygen and carbon dioxide gas barrier properties.

Various methods are known for the production of multilayered containers having gas-barrier properties.

For example, there was proposed a method of producing a multilayered container, which comprises using an injection-molding machine having an injection cylinder for a thermoplastic polyester resin and an injection cylinder for a meta-xylylene group-containing polyamide resin ("MX nylon" for short) as a thermoplastic gas barrier resin, and sequentially injecting the thermoplastic polyester resin and then the MX nylon from these separate injection cylinders into a single mold by one mold closing action to form a three-layered structure composed of an inside layer of the thermoplastic polyester resin, an outside layer of the thermoplastic polyester resin and a core layer of the MX nylon (Japanese Laid-Open Patent Publications Nos. 128516/1982 and 128520/1982; and the corresponding U.S. Pat. No. 4,535,901). If in this method, the amount of the MX nylon to be injected is decreased in an attempt to reduce the thickness of the core layer, the core layer of MX nylon cannot be formed entirely on the body portion.

There was also proposed a method in which a thermoplastic polyester resin, MX nylon and the thermoplastic polyester resin are injected sequentially in this order to form a five-layered structure with three layers of the thermoplastic polyester resin and two layers of MX nylon being laminated alternatively, and as a result, in spite of the two layers of MX nylon, the thickness of the MX nylon layers can be very much reduced and the amount of MX nylon injected can be decreased from that in the aforesaid method (Japanese Laid-Open Patent Publication Ser. No. 240409/1980 and corresponding U.S. Pat. application Ser. No. 87969 and European Patent Publication Ser. No. 161625; Japanese Laid-Open Patent Publication Ser. No. 108542/1986 and corresponding U.S. Pat. application Ser. No. 793095 and European Patent Publication Ser. No. 180,191).

Japanese Patent Publication Ser. No. 16326/1985 (corresponding to U.S. Pat. No. 4,174,413) discloses a method by which the amount of a gas-barrier resin injected can be decreased. In this method, part of a thermoplastic polyester resin is first injected, and then the remainder of the thermoplastic polyester resin and the gas-barrier resin are simultaneously injected. The product is of a three-layer structure in section in which the gas-barrier layer is shifted toward one side from the center.

Generally, the adhesion between PET and a resin having excellent gas-barrier property such as a m-xylylene group-containing polyamide resin or an ethylene/vinyl acetate copolymer is very poor, and the delamination resistance between PET and the gas-barrier resin layer is low. Consequently, delamination tends to occur between these resin layers when an external deforming force or an impact force is exerted on the container or an internal pressure is exerted as in a container filled with a solution containing carbon dioxide gas. The delaminated portion of the container separates into two films and looks slightly white. Hence, the appearance of the container is undesirable.

On the other hand, gas-barrier containers having a layer of a mixture of a gas-barrier resin and a thermoplastic polyester layer have also been proposed. For example, there have been proposed containers composed only of such a mixed resin layer (Japanese Laid-Open Patent Publications Ser. Nos. 90033/1983 and 160344/1983), and a multilayered container containing the above mixed barrier layer for preventing delamination between resin layers (Japanese Laid-Open Patent Publication Ser. No. 183243/1983 corresponding to U.S. Pat. No. 4,501,781). In the former containers, if the mixed layer (to be referred to as the uniformly mixed resin layer) results from sufficient mixing (to be referred to as uniform mixing) of two or more resins, haze occurs to reduce the transparency of the containers and therefore their merchandise value. In the latter container, delamination resistance between the gas-barrier layer and the PET layer increases, but haze occurs in the part of the uniformly mixed resin layer obtained by mixing in a usual manner, leading to a loss of transparency.

In the case of uniform mixing by a usual method, if the proportion of the gas-barrier resin in the uniformly mixed resin layer is increased, the resulting container becomes hazy in opalescent or pearly color, and no adhesion strength increases. On the other hand, if the proportion of the thermoplastic polyester resin in the uniformly mixed resin layer is increased, delamination resistance increases, but haze occurs in opalescent or pearly color.

We have extensively worked on this problem, and now found that in the production of a container by using a mixture of a thermoplastic resin (resin A) and another thermoplastic resin having gas-barrier property (resin B), the problem of haze depends upon the state of mixing the resins, and that this problem can be solved by mixing the resins in a specific multilayered state or a specific mixed state.

SUMMARY OF THE INVENTION

It is an object of this invention therefore to provide a container having excellent gas-barrier property, mechanical strength and transparency and a parison as a precursor of this container and processes for production thereof.

Another object of this invention is to provide a multilayered container having excellent gas-barrier property and mechanical strength and being free from delamination between resin layers and occurrence of haze in the resin layers, and a parison as a precursor of this container and processes for production thereof.

Still another object of this invention is to provide a multilayered container which when used for a long period of time as a container requiring gas-barrier properties with respect to oxygen and/or carbon dioxide, does not develop delamination between the resin layers; and a parison as a precursor of this container.

In one aspect, the objects of the invention are achieved by a parison, as a precursor of a container, composed at least of a thermoplastic resin (resin A) and another thermoplastic resin having excellent gas-barrier property (resin B) and containing a multilayered resin layer at least in an intermediate layer between an outermost layer and an innermost layer each composed of resin A at parts other than the open end part of the mouth portion of the parison, or wholly in the parison, said multilayered resin layer being formed by using an injection-molding machine equipped with a static mixing-stirring device provided in a nozzle portion of an injection cylinder, or in a mold, or in a resin flow passage between the nozzle portion and a mold, and injecting the resins A and B through the static mixing-stirring device so that flows of the resins A and B are divided in a plurality of thin layers parallel to the flowing direction.

In another aspect, the above objects of this invention are also achieved by a biaxially oriented multilayered container composed of a body portion and a mouth portion, at least the open end part of the mouth portion having a single structure composed of a thermoplastic resin (resin A), and at least the thin-walled part of the body portion being formed by alternately laminating one or more layers of a mixture of resin A and another thermoplastic resin having gas-barrier property (resin B) and layers of resin A, the number of resin A layers being larger than that of the mixed resin layers by one, wherein the total area proportion of resin A particles and resin B particles having a long diameter of not more than 10 microns in said mixed resin layer is not more than 10%.

BRIEF DESCRIPTION OF THE DRAWINGS

The present invention will now be described in greater detail with reference to the accompanying drawings.

DETAILED DESCRIPTION OF PREFERRED EMBODIMENTS

We found that in the production of a container by injection molding a mixture of resin A and resin B, the increase of haze is reduced and gas-barrier property is improved by forming a parison, by injection-molding a mixture in which resin A and resin B are not fully mixed. Based on this finding, we furthered our investigations.

In the injection molding of a parison as a precursor for containers, when two resins are melt-mixed using a mixing screw of an injection-molding machine normally used, the mixing is effected fully. As a result, in the resulting parison, most of the resin present in a smaller proportion exists in fine particles in the form of islands in the sea of the resin present in a larger proportion. The long diameter of the island-like particles is not more than 10 microns, and these islands was found to be the cause of haze.

We made investigations in an attempt to develop an injection-molding method which would reduce the proportion of the resin particles of a fine size in the injection molding of the parison, and found that it is possible to create a condition in which at least two thermoplastic resins are coalesced in the molded product as thin layers complexly laid in a two-dimensional direction and partly melt-coalesced (this condition may sometimes be referred to hereinafter as the special multilayered condition), and that this condition can reduce the occurrence of haze.

One preferred example of a multilayer-forming device for creating such a special multilayered condition is a generally known static mixing-stirring device.

When the static mixing-stirring device is used in this invention, the process of creating the special multilayered condition may be explained as follows.

When at least two resins pass through a plurality of elements in the static mixing-stirring device which exist in a resin flow passage, the resins are successively divided parallel to the flowing direction by these elements. The resins do not cross the stream line, but are repeatedly stretched, sheared and laid up. As a result, they are multilayered in a special condition.

By selecting the shapes and the number of these elements, there can be obtained a resin layer in which the two resins are multilayered in a special multilayered condition (this layer will sometimes be referred to as the multilayered resin layer).

An example of the static mixing-stirring device may be a known in-line mixer, for example those disclosed in U.S. Pat. Nos. 3,051,453 and 3,195,865.

One specific example of the static mixing-stirring device is a continuous stirring device having no driving section in which right-turning helical elements and left-turning helical elements are alternately arranged within a tube with their ends crossing adjacent elements at right angles.

When two molten resins are caused to flow in a static mixer, they form laminar flows. Hence, the two resins are rearranged as many divided layers and fluidized to form a multilayer structure in which the two resins are complexly laid as thin layers. Resin particles having a fine particle diameter which increase haze are present in a very small proportion in the multilayered resin layer in the present invention, and therefore, there is very little haze formed on the molded container.

We also made investigations on another injection-molding method by which the proportion of fine resin particles in the production of a parison by injection molding can be decreased. It was consequently found that if the mixing of the resins is coarse, there are hardly any such resin particles having a fine size present in the mixed resin layer (to be referred to as the coarsely mixed layer) in the blow-molded container.

To create such a coarsely mixed condition, mixing may be carried out by using a cylinder having a screw with a low kneading effect and as required, a lubricant such as stearic acid or stearate salts. In the case of utilizing the coarsely mixed condition, the thickness of the thin-walled part of the body portion of the container is desirably 200 to 3,000 microns, and the thickness of the coarsely mixed layer is 10 to 300 microns.

We have further found that to adjust the haze (measured in accordance with JIS K6714) to 15% or below as generally required in transparent containers, the total area proportion of resin A particles and resin B particles which have a long diameter of not more than 10 microns in the mixed resin layer should be adjusted to 10% or less.

The multilayered resin layer may be used alone or in combination with a PET layer to form a parison.

When a parison composed of this multilayered resin layer is biaxilly stretched and blow-molded, a container having excellent transparency and gas-barrier property can be obtained.

A container composed of the multilayered resin layer or the coarsely mixed layer as a gas-barrier layer and PET layers surrounding the gas-barrier layer has greatly improved delamination resistance between the barrier layer and the PET layer. In addition, the amount of the gas-barrier resin which is higher in cost than PET can be reduced.

To form such a multilayered resin layer, it is important to stack resin B and resin A as many thin film-like layers without sufficiently mixing them. To form the coarsely mixed layer, it is important to intermix the two resins without fully mixing them.

Some examples of an apparatus for molding a container having the multilayered resin layer or the coarsely mixed layer will be described.

Figure 1:
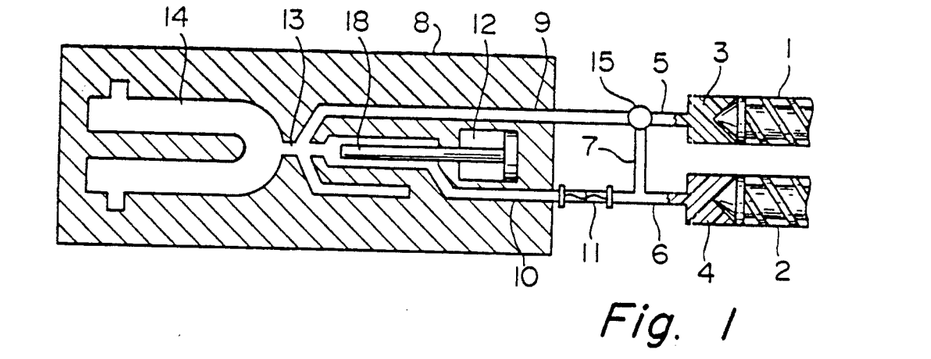
FIG. 1 is a schematic view showing an example of an apparatus for forming a parison as a precursor of a container in the present invention.

FIG. 1 is a schematic view showing one example of an apparatus for forming a parison by injection molding in accordance with this invention.

As is the case with an ordinary apparatus, this apparatus has a cylinder 1 for resin A and a cylinder 2 for resin B. Resin A and resin B melted in the cylinders 1 and 2, and the molten resin A alone, or both resins A and B, are injected into a cavity 14 within a mold 8. To produce a multilayered resin layer composed of the resins A and B, the apparatus has a switch valve 15, a linking pipe 7 and a multilayer-forming device 11.

When in this apparatus, the switch valve 15 permits linking of a nozzle 5 for the resin A to a resin A flow passage 9 within the mold, the resin A can be injected into the cavity 14 as in the conventional method.

When the switch valve 15 is switched off to permit communication of the nozzle 5 with the linking pipe 7, the simultaneous application of pressure to the cylinder 1 and the cylinder 2 makes it possible to create a special multilayered condition in a multilayer-forming device from the molten resin A which has passed through the nozzle 5 and the linking pipe 7 and the molten resin B which has passed through a nozzle 6, and to inject the mixture in the multilayered condition into the cavity 14 via the flow passage 10 and the gate 13.

FIGS. 4 to 8 are schematic views in section of some examples of containers in accordance with this invention obtained by using the apparatus shown in FIG. 1.

Figures 4, 5, 6, 7, 8:
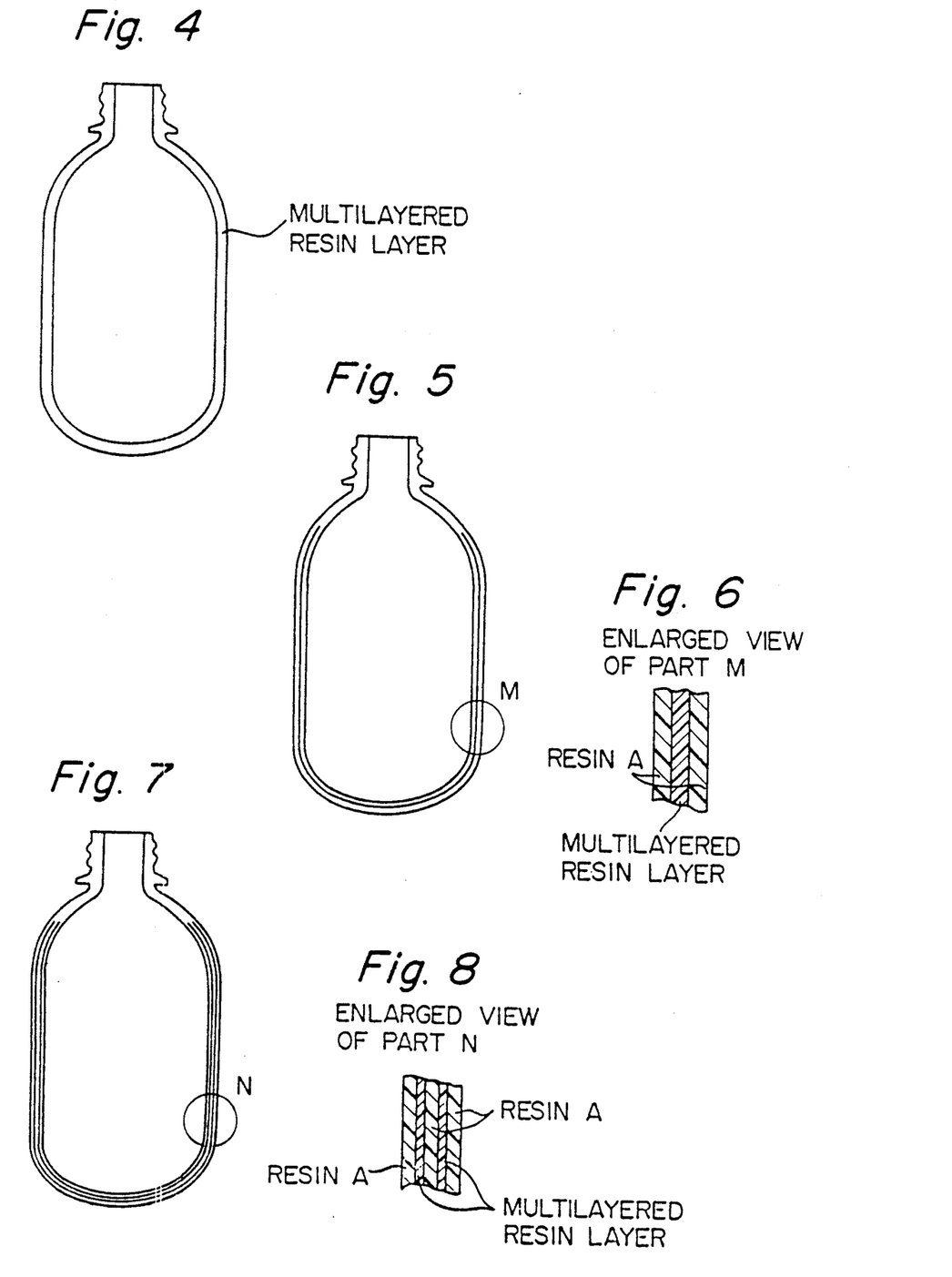
FIG. 4 is a schematic sectional view of a container entirely made of a multiplicity of resins in accordance with this invention.
FIGS. 5 and 6 are schematic sectional views of containers in which one interlayer composed of a multiplicity of resin layers is present.
FIGS. 7 and 8 are schematic sectional views of containers in which two layers each composed of a multiplicity of resin layers are present in the intermediate part.

The container shown in FIG. 4 is formed entirely of a multilayered resin layer. The container shown in FIGS. 5 and 6 contains one multilayered resin layer as an interlayer. The container shown in FIGS. 7 and 8 contains two multilayered resin layers in the middle.

Figures 3, 9:
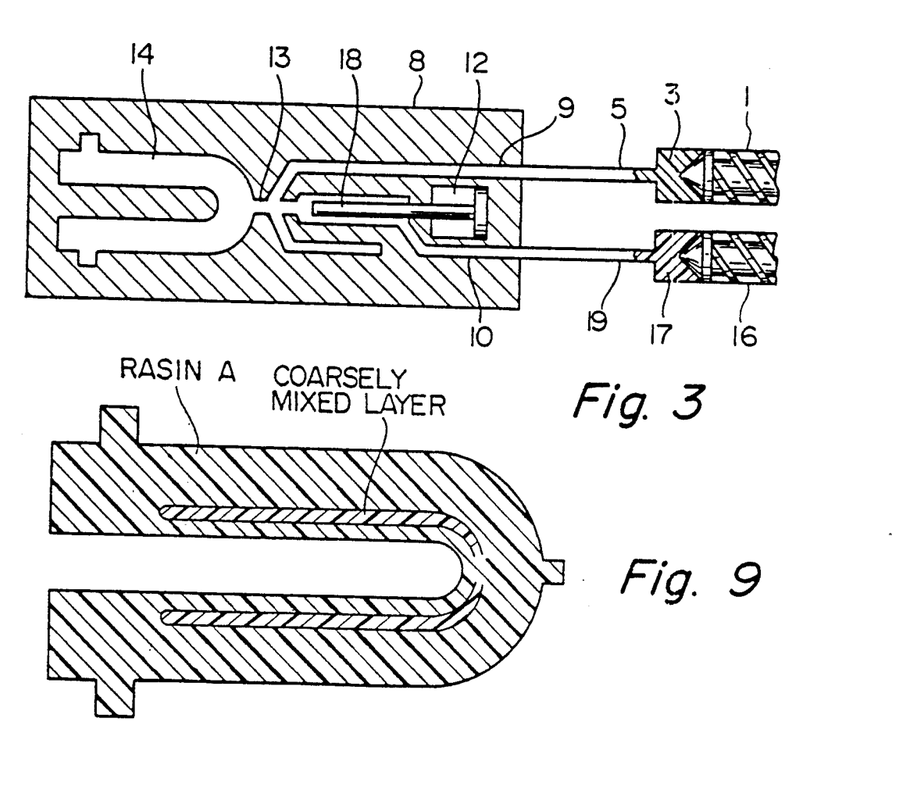
FIG. 3 schematically shows an example of another apparatus for forming a parison in accordance with this invention.
FIG. 9 is a schematic sectional view of a parison as a precursor of a multilayered container of the invention in which one interlayer composed of a resin mixture is present.

FIG. 3 is a schematic view of another injection-molding apparatus.

The apparatus of FIG. 3 has a cylinder 1 for resin A and a cylinder 16 for a coarse mixture of resins A and B. A parison of a three-layered structure shown in FIG. 9 is obtained by first injecting a resin A and then simultaneously injecting the resin A and a mixture of resins A and B with this apparatus.

Examples of the resin A used in this invention are thermoplastic polyester resins, polyolefin resins, polycarbonate, polyacrylonitrile, polyvinyl chloride and polystyrene. The thermoplastic polyester resins are preferred.

Examples of the resin B which is a thermoplastic gas-barrier resin are MX nylon, a saponified ethylene/vinyl acetate copolymer resin, polyacrylonitrile copolymer resins and polyvinylidene chloride resin. MX nylon is preferred.

A combination of a thermoplastic polyester resin, especially polyethylene terephthalate, and MX nylon is most preferred because this combination has excellent transparency, mechanical strength, injection-moldability and stretch-blow moldability.

The thermoplastic polyester resin usually denotes a polyester composed of an acid component at least 80 mole %, preferably at least 90 mole %, of which consists of terephthalic acid and a glycol component at least 80 mole %, preferably at least 90 mole %, of which consists of ethylene glycol. Examples of the other acid component are isophthalic acid, diphenyl ether-4,4-dicarboxylic acid, naphthalene-1,4 or 2,6-dicarboxylic acid, adipic acid, sebacic acid, decane-1,10-dicarboxylic acid, and hexahydroterephthalic acid, and examples of the other glycol component include propylene glycol, 1,4-butanediol, neopentyl glycol, diethylene glycol, cyclohexanedimethanol, 2,2-bis(4-hydroxyphenyl)propane and 2,2-bis(4-hydroxyethoxyphenyl)propane. Polyester resins containing a hydroxycarboxylic acid such as p-hydroxybenzoic acid may also be cited as examples.

These thermoplastic polyester resins suitably have an inherent viscosity of at least 0.55, preferably 0.65 to 1.4. If their inherent viscosity is less than 0.55, it is difficult to obtain a transparent amorphous multilayered parison, and a container made from it has insufficient mechanical strength.

The MX nylon denotes a polymer containing at least 70 mole % of structural units obtained from m-xylylenediamine alone or mixed xylylenediamine containing m-xylylenediamine and not more than 30%, based on the total amount, of p-xylylenediamine, and an alpha, omega-aliphatic dicarboxylic acid having 6 to 10 carbon atoms.

Examples of the MX nylon include homopolymers such as poly-m-xylylene adipamide, poly-m-xylylene sebacamide and poly-m-xylylene suberamide; copolymers such as m-xylylene/p-xylylene adipamide copolymer, m-xylylene/ p-xylylene pimelamide copolymer and m-xylylene/p-xylylene azelamide copolymer; and copolymers obtained by copolymerizing the components of these homo-or co-polymers with aliphatic diamines such as hexamethylenediamine, alicyclic diamines such as piperazine, aromatic diamines such as p-bis-(2-aminoethyl)benzene, aromatic dicarboxylic acids such as terephthalic acid, lactams such as epsilon-caprolactam, omega-aminocarboxylic acids such as omega-aminoheptanoic acid, and aromatic aminocarboxylic acids such as p-aminobenzoic acid.

Nylon 6, nylon 66, nylon 610 and nylon 11 may also be included within the examples of these polymers.

The suitable relative viscosities of these MX nylons are at least 1.5, preferably 2.0 to 4.0.

As required, a coloring agent, an ultraviolet absorber, an antistatic agent, an antioxidant, a lubricant, a nucleating agent, etc. may be incorporated in one or both of the resins A and B in amounts which do not impair the objects of this invention.

The container of this invention can be produced by biaxilly stretching the parison at a temperature of 70 to 130° C to 1 to 4 times in the axial direction and 2 to 7 times in the circumferential direction and at an area ratio of 5 to 15.

The ratio of the resin A to the resin B in the multilayered resin layer having gas-barrier property can be varied over a wide range. The volume ratio of the resin A to resin B is from 1:40 to 40:1, preferably 1:20 to 20:1.

In the present invention, the container may be formed entirely of the multilayered resin layer, or may be of a laminated structure of the resin A layer and the multilayered resin layer.

In the latter case, the number of the multilayered resin layers is not limited, but in view of productivity, it is suitably 1 to 3.

The thermoplastic gas-barrier resin B, in the unstretched state, may sometimes become whitened or decrease in gas-barrier property upon absorption of moisture from goods filled in the container. Preferably, therefore, the non-stretched open end part of the mouth portion of the container is formed of a single layer of the resin A.

According to this invention, a container having excellent gas-barrier property and transparency is obtained by using the multilayered resin layer or the coarsely mixed layer instead of using a uniformly mixed resin layer in which a plurality of resins are fully mixed.

The container provided by this invention is innovative in that it has excellent transparency, gas-barrier property and mechanical strength and the delamination resistance between the resin layers is further improved.

The following examples illustrate the present invention in greater detail.

The various properties of the resins and the containers in the following examples were measured by the following methods.

(1) Inherent viscosity $[\eta]$ of a polyester resin

Measured at 30° C using a mixture of phenol and tetrachloroethane (6:4 by weight).

(2) Relative viscosity of $[\eta_{rel}]$ of a polyamide resin

Measured at 25° C using a solution of 1 g of the resin in 100 ml of 96% sulfuric acid.

(3) Haze

The haze is defined as [diffusion transmittance (quantity of light)/total transmittance (quantity of light)]×100 in accordance with ASTM D1003-01, and measured by a digital hazemeter (Model NDH-2D) made by Nippon Denshoku Kogyo Co., Ltd.

(4) Delamination resistance

Peeling direction: 180°

Peeling speed: 300 mm/min.

Sample size: 25 mm in width and 170 mm in length (5) Oxygen permeability (amount of oxygen permeated)

Measured at a relative humidity of 100% inside and 65% outside at 20° C. using OXTRAN100 made by Modern Control Company substantially in accordance with the MOCON method (ASTM D 3985).

(6) Proportion of particles having a long diameter of not more than 10 microns in the mixed resin layer The mixed resin layer was treated with a dye (Kayanol Red NB No. Q 02705, a tradename for a product of Nippon Kayaku Co., Ltd.) capable of dyeing only poly-m-xylylene adipamide. The long diameters of the dyed poly-m-xylylene adipamide particles and the non-dyed polyester resin particles and the total area of these particles were measured under a microscope. The proportion of the total area of those poly-m-xylylene adipamide resin particles and polyester resin particles which had a long diameter of not more than 10 microns was expressed in percentage based on the total area of the entire measured resin particles.

EXAMPLES 1-3

An apparatus (Model M-200 PDM-MJ made by Meiki Company Ltd.) of the type shown in FIG. 1 of the accompanying drawings was used which was provided with a static mixing-stirring device [Noritake Static Mixer-(tradename), Model N20 (diameter 12.3 mm, 7 elements), made by Noritake Co., Ltd.] as a multilayer-forming device. Nozzle 5 for resin A was maintained always in communication with linking pipe 7 by means of valve 15, and PET having an inherent viscosity of 0.75 (resin A) and N-MXD 6 having a relative viscosity of 2.1 (resin B) were simultaneously injected by using the above apparatus to form a parison composed only of a multilayered resin layer.

The mixing volume ratio of PET to N-MXD6 was 19:1 in Example 1, 9:1 in Example 2 and 8:2 in Example 3, and the temperature conditions during the injection molding were as follows:

Injection cylinder for resin A: 270° C
Injection cylinder for resin B: 260° C
Resin flow passage in the mold: 270° C
Mold cooling water: 10° C The above injection molding gave a parison having a total length of 145 mm, an outside diameter of 30 mm, a thickness of 4.5 mm and a weight of about 59 g.

In a biaxial stretch blow-molding machine, the parison was heated by a quartz heater until its surface temperature reached 95° C, and the heated parison was transferred into a blow-molding mold. It was then biaxially stretched and blow-molded at a stretching rod moving speed of 20 cm/sec under a stretch blow pressure of 20 kg/cm² to give a bottle-shaped hollow container having a total length of pb 300 mm, an outside diameter of 90 mm, an inner capacity of 1500 ml and a thickness at its body portion of 400 microns.

The amount of oxygen permeated through the resulting container was measured. A test piece was cut out from its body portion, and its haze was measured.

The results are shown in Table 1.

COMPARATIVE EXAMPLES 1-2

Figure 2:
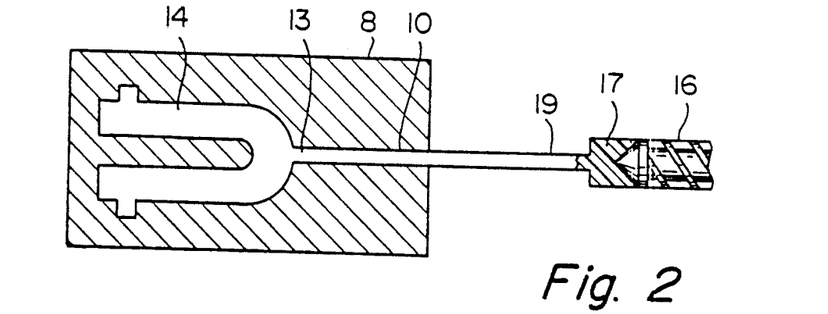
FIG. 2 is a schematic view showing an example of an injection-molding machine for forming a parison entirely made of a uniformly mixed resin layer presented for comparison with the parison of the present invention.

For comparison, an injection molding machine (Model M-200 PDM-MJ made by Meiki Company, Ltd.) of the type shown in FIG. 2 which did not include a multi-layer-forming device was used. A mixture of the same resins A and B as used in Examples 1 to 3 in a predetermined mixing ratio was put into a portion 17 shown in FIG. 2, and injection-molded to give a parison composed of a fully mixed uniform mixed resin layer.

The mixing volume ratio of PET to N-MXD6 was 19:1 in Comparative Example 1, and 9:1 in Comparative Example 2. Otherwise, the injection molding was carried out under the same conditions as in Examples 1 to 3.

The parison was then biaxially stretched and blow-molded as in Example 1 to give a bottle-shaped hollow container.

The resulting container was tested as in Examples 1 to 3, and the results are shown in Table 1.

EXAMPLES 4-5

The same resins A and B as used in Example 1 were injection-molded by the same apparatus as used in Example 1 to form a parison.

The mixing volume ratio of PET to N-MXD6 was set at 9:1 in Example 4 and 8:2 in Example 5.

Specifically, resin A alone was first injected. Then, while nozzle 5 for resin A was maintained in communication with linking pipe 7 by means of valve 15, an injection pressure was applied to cylinder 3 for resin A and cylinder 4 for resin B, and resins A and B were converted into a special multilayered condition within the multilayer-forming device and then injected into the mold. Finally, resin A was again injected.

The amounts of the resins injected, expressed as the volume percentage based on the capacity of the cavity, were as follows:

Resin A in the first injection: 65%
Resins A and B in the second injection: 30%
Resin A in the third injection: 5%

The temperature conditions at the time of injection molding were as follows:

Injection cylinder for resin A: 270° C
Injection cylinder for resin B: 260° C
Resin flow passage in the mold: 270° C
Mold cooling water: 10° C The above injection molding gave a parison having a total length of 145 mm, an outside diameter of 30 mm, a thickness of 4.5 mm and a weight of about 59 g.

In a biaxial stretch blow-molding machine, the parison was heated by a quartz heater until its surface temperature reached 95° C, and the heated parison was transferred into a blow-molding mold. It was then biaxially stretched and blow-molded at a stretching rod moving speed of 20 cm/sec. under a stretch blow pressure of 20 kg/cm² to give a bottle-shaped hollow container having a total length of 300 mm, an outside diameter of 90 mm, an inner capacity of 1500 ml and a thickness at its body portion of 400 microns.

In the body portion of the container, the thickness ratio of the inside PET layer/the multilayered resin layer/the outside PET layer was 3.5:3:3.5.

The amount of oxygen permeated through the container was measured. Furthemore, test pieces were cut out from its body portion, and the haze of the body portion and the delamination resistance between the PET layer and the multilayered resin layer was measured.

The results are shown in Table 2.

COMPARATIVE EXAMPLES 3-4

For comparison, the same resins as used in Examples 4 and 5 were injection-molded using an injection-molding machine of the type shown in FIG. 3 which did not include a multilayer-forming device.

Specifically, resin A was put into cylinder 1, and a mixture of resins A and B in a predetermined ratio was put into a portion 17. These resins were injection-molded to form a parison having the same layer construction as in Examples 4 and 5 except that the multilayered resin layer was replaced by a uniformly mixed resin layer.

The mixing volume ratio of PET to N-MXD6 in the uniformly mixed resin layer was 7:3 in Comparative Example 3 and 3:7 in Comparative Example 4.

The amounts of the resins injected, expressed as the percentage based on the capacity of the cavity, were as follows:

Resin A in the first injection: 80%
Resins A and B in the second time: 15%
Resin A in the third injection: 5%

Otherwise, the same injection-molding and biaxial stretch blow molding as in Examples 4 and 5 were carried out.

The results of the tests are shown in Table 2.

COMPARATIVE EXAMPLE 5

A five-layered parison was produced in the same way as in Examples 4 and 5 except that the injection-molding machine (Model M-200 PDM-MJ made by Meiki Company Ltd.) shown in FIG. 3 was used and the same N-MXD6 as used in Examples 4 and 5 was used instead of the multilayered resin layer.

The amounts of the resins injected, expressed as the percentage based on the capacity of the cavity, were as follows:

Resin A in the first injection: 80%
N-MXD6 in the second injection: 3%
Resin A in the third injection: 17%

The parison was biaxially stretched and blowmolded by the same method as in Examples 4 and 5. The thickness ratio of the inside PET layer/the N-MXD6 layer/the central PET layer/the N-MXD6 layer/outside PET layer was 4:1:4:1:7.

The container was tested in Examples 4 and 5, and the results are shown in Table 2.

TABLE 1

| Run(*) | Haze (%) | Amount of oxygen permeated (cc/pack day) | Amount of N-MXD6 used (%)(**) |
|---|---|---|---|
| Ex. 1 | 3.0 | 0.0336 | 5 |
| Ex. 2 | 3.2 | 0.0244 | 10 |
| Ex. 3 | 3.6 | 0.0217 | 20 |
| CEx. 1 | 27.1 | 0.0361 | 5 |

TABLE 1-continued

| Run(*) | Haze (%) | Amount of oxygen permeated (cc/pack day) | Amount of N-MXD6 used (%)(**) |
|---|---|---|---|
| CEx. 2 | 30.5 | 0.0266 | 10 |

(*)Ex. stands for Example, and CEx., Comparative Example.
(**)The amount of N-MXD6 used based on the total amount of the resins used to make the container.

TABLE 2

| Run (*) | Haze (%) | Delamination resistance (kg/m) | Amount of oxygen permeated (cc/pack day) | Amount of N-MXD6 used (%) (**) |
|---|---|---|---|---|
| Ex. 4 | 3.0 | 10.8 | 0.0226 | 3 |
| Ex. 5 | 3.1 | 8.8 | 0.0211 | 6 |
| CEx. 3 | 27.3 | 23.2 | 0.0347 | 5 |
| CEx. 4 | 31.2 | 3.2 | 0.0258 | 11 |
| CEx. 5 | 3.0 | 4.0 | 0.0314 | 3 |

(*) and (**)same as the footnote in Table 1.

EXAMPLES 6-7

The same resins A and B as used in Example 1 were injection-molded by using the apparatus (Model M-200 PDM-MJ made by Meiki Company Ltd.) shown in FIG. 3 except that a screw having inferior kneading effect (pitch 40 mm; the number of threads 19; the compression ratio, which is the ratio of the sectional area of the inlet of the screw to the sectional area of its outlet, 2.30) to one of an ordinary shape was used as cylinder 16 for a mixed resin unlike the case of Comparative Examples 3 to 5. The mixing weight ratio of PET to N-MXD6 in the mixed resin was set at 7:3 in Example 6 and 3:7 in Example 7.

Moreover, 0.1% by weight, based on the mixed resin, of calcium stearate was added to lower the kneading effect of the cylinder 16 in FIG. 3.

Resin A alone was first injected, and then a the resin A and a mixture of resins A and B were simultaneously injected.

The amounts of the resins injected, expressed as the percentage based on the capacity of the cavity, were as follows:
Resin A injected first: 70%
Mixed resin injected next: 15%
Resin A injected next: 15%

The temperature conditions during the were as follows:
Injection cylinder for resin A: 270° C
Injection cylinder for the mixed resin: 260° C
Resin flow passage in the mold: 270° C
Mold cooling water: 15° C The above injection-molding gave a parison having a three-layered body portion with a thickness of 4.5 mm and weighing about 59 g. The cross section of the parison was as shown in FIG. 9.

In a biaxial stretch blow-molding machine, the parison was heated by a quartz heater until its surface temperature reached 95° C, and the heated parison was transferred into a blow-molding mold. It was then biaxially stretched and blow-molded at a stretching rod moving speed of 20 cm/sec. under a stretch blow pressure of 20 kg/cm² to give a bottle-shaped hollow container having a total length of 300 mm, an outside diameter of 90 mm, an inner capacity of 1500 ml and a thickness at its body portion of 400 microns.

In the body portion of the container, the thickness ratio of the outside PET layer/the mixed resin layer/the inside PET layer was 6:2:2.

The amount of oxygen permeated through the container was measured. Furthemore, test pieces were cut out from its body portion, and the haze of the body portion and the proportion of particles having a long diameter of not more than 10 microns in the mixed resin layer were measured.

The results are shown in Table 3.

COMPARATIVE EXAMPLES 6-7

For comparison, the procedure of Examples 6 and 7 was repeated except that a screw having a better kneading effect (pitch 30 mm; compression ratio 3.03; 25 threads) was used instead of the screw used in Examples 6 and 7; no calcium stearate was added; and the mixing weight ratio of PET to N-MXD6 in the mixed resin layer parative Example 7.

The results are shown in Table 3.

COMPARATIVE EXAMPLES 8-9

For comparison, the procedure of Examples 6 and 7 was repeated except that a screw having a better kneading effect (pitch 35 mm; compression ratio 3.03; 25 threads) higher than in Examples 6 and 7 but lower than in Comparative Examples 6 and 7 was used; the amount of calcium stearate was decreased to 0.01 % by weight; and the mixing weight ratio of PET to N-MXD6 was set at 7:3 in Comparative Example 8 and 3:7, in Comparative Example 9.

The results are shown in Table 3.

COMPARATIVE EXAMPLE 10

For comparison, the procedure of Examples 6 and 7 was repeated except that N-MXD6 was used instead of the mixture of the resins A and B.

After biaxial stretch blow-molding, the thickneess ratio of the outside PET layer/the N-MXD6 layer/the inside PET layer in the body portion of the container was 6:2:2.

The results are shown in Table 3.

TABLE 3

| Run (*) | Haze (%) | Delamination resistance (kg/m) | Oxygen permeability (cc/pack day) | Mixed state (%) (***) |
|---|---|---|---|---|
| Ex. 6 | 2.7 | 19.7 | 0.0341 | 1 |
| Ex. 7 | 3.9 | 12.1 | 0.0234 | 1 |
| CEx. 6 | 27.1 | 22.6 | 0.0355 | 90 |
| CEx. 7 | 30.5 | 3.0 | 0.0264 | 90 |
| CEx. 8 | 20.0 | 21.6 | 0.0221 | 17 |
| CEx. 9 | 28.4 | 14.7 | 0.0357 | 30 |
| CEx. 10 | 3.0 | 4.0 | 0.0157 | — |

(*)Same as the footnote to Table 1.
(***)The mixed state is expressed by the proportion of resin particles having a long diameter of not more than 10 microns in the mixed resin layer.

What we claim is:
1. A parison, as a precursor of a container, formed by using an injection-molding machine, comprising
an open end part of a mouth portion composed of a thermoplastic resin (resin A), and
parts other than the open end part of the mouth portion comprising an inside surface layer and an outside surface layer which are composed of the resin A, and an interlayer located between the inside surface layer and the outside surface layer, said interlayer being composed of the resin A and an- other thermoplastic resin having superior gas-barrier properties (resin B) with respect to resin A, said interlayer having a multi-layered structure comprising thin layers of the resin A and thin layers of the resin B laminated alternately in the radial direction of the parison wherein part of said thin layers of the resin A and part of said thin layers of the resin B are discontinuous in the circumferential direction and/or the axial direction of the parison, and being formed by injecting the resin A and the resin B through a static mixing-stirring device, which is provided in a nozzle portion of an injection cylinder, or in a mold, or in a resin flow passage between the nozzle portion of the injection cylinder and the mold, so that flows of the resin A and the resin B are divided in a plurality of thin layers of the resin A and thin layers of the resin B parallel to the flowing direction thereof.

2. The parison of claim 1 wherein the volume ratio of the resin A to the resin B in said interlayer is from 1:40 to 40:1.

3. The parison of claim 1 wherein the resin A is a thermoplastic polyester resin having ethylene therphthalate recurring units as main recurring units.

4. The parison of claim 1 wherein the resin B is a m-xylylene group-containing polyamide resin.

5. A parison, as a precursor of a container, formed by using an injection-molding machine, comprising an open end part of a mouth portion composed of a thermoplastic resin (resin A) and parts other than the open end part of the mouth portion comprising an inside surface layer, a middle layer and an outside surface layer which are composed of the resin A, and two interlayers, one of which is located between the inside surface layer and the middle layer and the other of which is located between the middle layer and the outside surface layer, said each interlayer being composed of the resin A and another thermoplastic resin having superior gas-barrier properties (resin B) with respect to resin A, said each interlayer having a multi-layered structure comprising thin layers of the resin A and thin layers of the resin B laminated alternately in the radial direction of the parison wherein part of said thin layers of the resin A and part of said thin layers of the resin B are discontinuous in the circumferential direction and/or the axial direction of the parison, and being formed by injecting the resin A and the resin B through a static mixing-stirring device, which is provided in a nozzle portion of an injection cylinder, or in a mold, or in a resin flow passage between the nozzle portion of the injection cylinder and the mold, so that flows of the resin A and the resin B are divided in a plurality of thin layers of the resin A and thin layers of the resin B parallel to the flowing direction thereof.

6. The parison of claim 5 wherein the volume ratio of the resin A to the resin B in said each interlayer is from 1:40 to 40:1.

7. The parison of claim 5 wherein the resin A is a thermoplastic polyester resin having ethylene terephthalate recurring units as main recurring units.

8. The parison of claim 5 wherein the resin B is a m-xylylene group-containing polyamide resin.

9. A blow-molded container formed by biaxilly stretching and blow-molding a parison as a precursor of a container, said parison being formed by using an injection-molding machine and said parison comprising an open end part of a mouth portion composed of a thermoplastic resin (resin A), and parts other than the open end part of the mouth portion comprising an inside surface layer and an outside surface layer which are composed of the resin A, and an interlayer located between the inside surface layer and the outside surface layer, said interlayer being composed of the resin A and another thermoplastic resin having superior gas-barrier properties (resin B) with respect to resin A, said interlayer having multi-layered structure comprising thin layers of the resin A and thin layers of the resin B laminated alternately in the radial direction of the parison wherein part of said thin layers of the resin A and part of said thin layers of the resin B are discontinuous in the circumferential direction and/or the axial direction of the parison, and being formed by injecting the resin A and the resin B through a static mixing-stirring device, which is provided in a nozzle portion of an injection cylinder, or in a mold, or in a resin flow passage between the nozzle portion of the injection cylinder and the mold, so that flows of the resin A and the resin B are divided in a plurality of thin layers of the resin A and thin layers of the resin B parallel to the flowing direction thereof.

10. The blow-molded container of claim 5 wherein the volume ratio of the resin A to the resin B in said interlayer is from 1:40 to 40:1.

11. The blow-molded container of claim 9 wherein the resin A is a thermoplastic polyester resin having ethylene terephthalate recurring units as main recurring units.

12. The blow-molded container of claim 9 wherein the resin B is a m-xylylene group-containing polyamide resin.

13. A blow-molded container formed by biaxially stretching and blow-molding a parison as a precursor of a container, said parison being formed by using an injection-molding machine and said parison comprising an open end part of a mouth portion composed of a thermoplastic resin (resin A), and parts other than the open and part of the mouth portion comprising an inside surface layer, a middle layers and an outside surface layer which are composed of the resin A, and two interlayers, one of which is located between the inside surface layers and the middle layer and the other of which is located between the middle layer and the outside surface layer, said each interlayer being composed of the resin A and another thermoplastic resin having superior gas-barrier properties (resin B) with respect to resin A, said each interlayer having a multi-layered structure comprising thin layers of the resin A and thin layers of the resin B laminated alternately in the radial direction of the parison wherein part of said thin layers of the resin A and part of said think layers of the resin B are discontinuous in the circumferential direction and/or the axial direction of the parison, and being formed by injecting the resin A and the resin B through a static mixing-stirring device, which is provided in a nozzle portion of an injection cylinder, or in a mold, or in a resin flow passage between the nozzle portion of the injection cylinder and the mold, so that flows of the resin A and the resin B are divided in a plurality of thin layers of the resin A and thin layers of the resin B parallel to the flowing direction thereof.

14. The blow-molded container of claim 13 wherein the volume ratio of the resin A to the resin B in said each interlayers is from 1:40 to 40:1.

15. The blow-molded container of claim 13 wherein the resin A is a thermoplastic polyester resin having ethylene terephthalate recurring units as main recurring units.

16. The blow-molded container of claim 13 wherein the resin B is a m-xylylene group-containing polyamide resin.

* * * * *